Aug. 28, 1951 H. W. HEM 2,566,198
WEIGHING SCALE LIGHT SWITCH
Filed Aug. 9, 1949
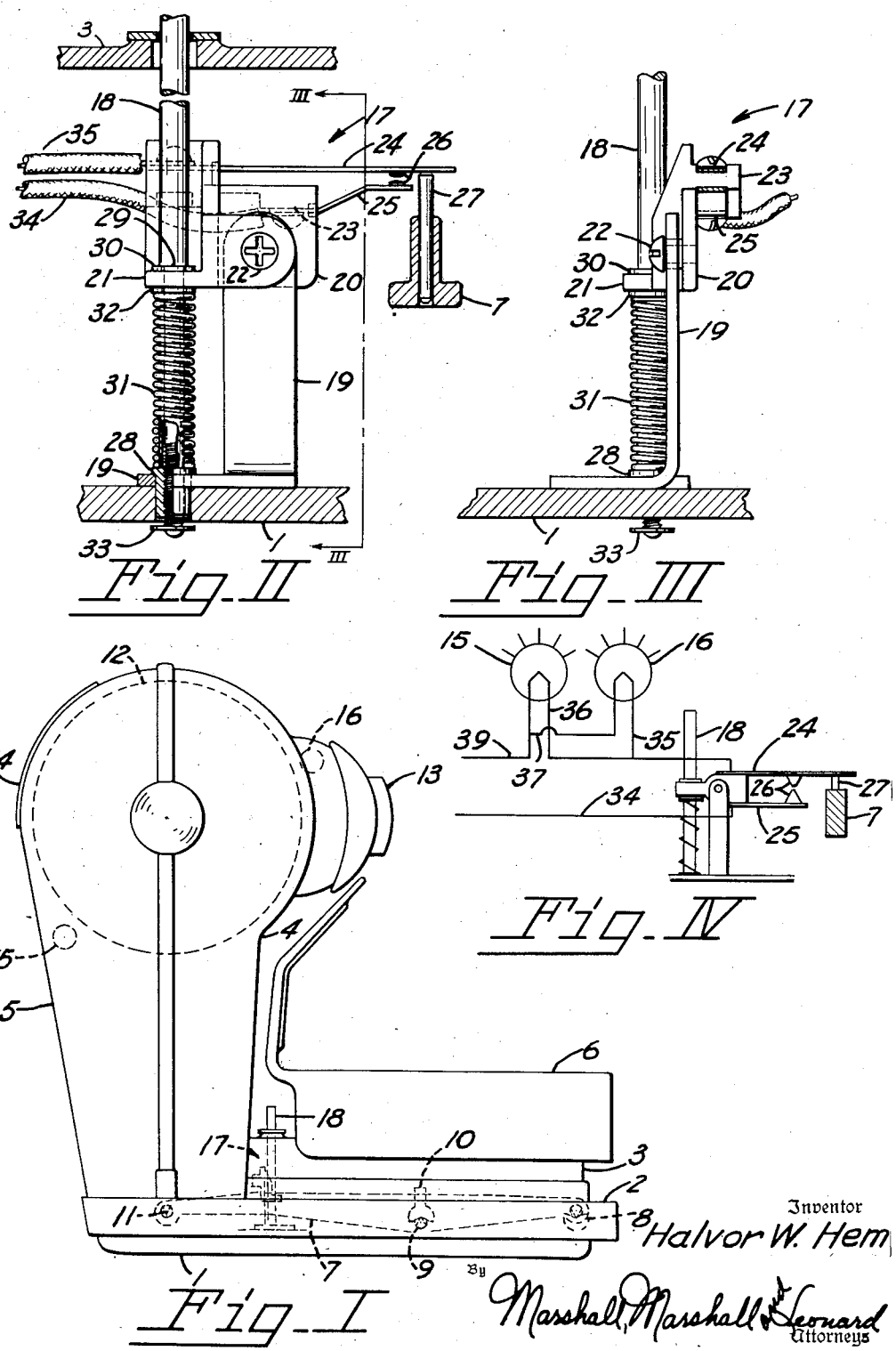
Inventor
Halvor W. Hem
By
Marshall, Marshall & Leonard
Attorneys Patented Aug. 28, 1951

2,566,198

UNITED STATES PATENT OFFICE 2,566,198

WEIGHING SCALE LIGHT SWITCH

Halvor W. Hem, Toledo, Ohio, assignor to Toledo Scale Company, Toledo, Ohio, a corporation of New Jersey Application August 9, 1949, Serial No. 109,327

2 Claims. (Cl. 200—52)

This invention relates to weighing scales such as are used in retail stores and in particular to an improved light switch that is controlled by the movement of the weighing scale lever and that is constructed to permit adjustment without disassembly of the housing of the weighing scale.

Weighing scales such as are used in retail stores are usually equipped with electric lights for illuminating the chart indicia and thus facilitate the reading of the scale. In the interest of economy it is desirable that these electric lights burn only while there is a load on the scale. Therefore, sensitive switches are arranged to be operated by movement of a weighing scale lever to turn on the lights as soon as there is a small load placed on the scale. In the past it has been customary to mount the switches within the housing and as a result it was necessary to remove at least a portion of the housing before any adjustment of the switch could be made. It is desirable that some means of adjustment of the switch contacts be available externally of the housing so that the point of operation of the switch may be maintained close to the zero load position of the lever.

It is therefore an object of this invention to provide an improved light switch that is simple to construct and that may be adjusted without disassembly of any portion of the weighing scale housing or other mechanism.

Another object of the invention is to provide, in the improved light switch, means for limiting the range of adjustment of the switch.

A still further object is to provide a switch assembly in which all backlash is removed so that the switch remains in adjusted position without requiring any locking or clamping device.

More specific objects and advantages are apparent from the following description of an improved form of switch constructed according to the invention. The improved form of switch is illustrated in the accompanying drawings.

In the drawings:

Figure I is a side elevation with parts broken away and other parts shown in outline of a weighing scale embodying the improved switch.

Figure II is an enlarged elevation of the improved switch.

Figure III is a fragmentary elevation taken substantially along the line III—III of Figure II.

Figure IV is a simplified schematic diagram of the improved switch showing its adjusting mechanism and its cooperation with the weighing scale lever.

These specific figures and the accompanying description are intended merely to illustrate the invention but to impose limitations on its scope.

A weighing scale embodying the improved switch is built on a generally rectangular dish-shaped base 1 having an upstanding rim 2 upon which molded housing portions 3, 4 and 5 rest. The housing portion 3 is relatively low and covers the forward portion of the base 1 and is itself covered by a load receiver 6 that is supported on a lever 7 mounted in the base 1 of the scale. The lever 7 is fulcrumed on bearings 8 set in the forward corners of the base 1 and includes knife edges 9 that support bearings 10 set in the spider that carries the load receiver 6. Load forces transmitted through the lever 7 to its power pivot 11 are counterbalanced by a pendulum counterbalancing mechanism, not shown, that is included within the space enclosed by the housing sections 4 and 5. A chart 12 rotatably mounted in the upper portion of the housing of the scale is rotated by the counterbalancing mechanism through an angle that is proportional to the load being weighed. The chart 12 is provided with indicia that may be read through a magnifying lens assembly 13 mounted on the front portion of the housing or through a small lens or window carried in a back plate 14 on the customer's side of the housing. The chart indicia are illuminated by electric lamps 15 and 16 that are located within the housing in position to illuminate those portions of the chart 12 that are visible through the magnifying glass 13 or the window in the back plate 14.

The current flow to the light bulbs 15 and 16 is controlled by a switch 17 mounted in the base 1 of the scale with an adjusting rod 18 extending upwardly through the top of the housing portion 3 at a point near the wall of the housing 4. The upper end of the adjusting rod 18 is thus accessible after the scale is completely assembled so that the operation of the light switch may be adjusted from time to time as may be required.

Referring now to Figures II and III the switch 17 is carried on the upper end of an upstanding post 19 erected from the base 1. The switch 17 is built on a frame 20 pivotally mounted on the post 19. The frame 20 includes a generally horizontal shelf 21 extending laterally at about the same elevation as a screw 22 constituting the pivotal connection between the frame 20 and the post 19. The frame 20 is itself a formed member having a pair of legs that straddle the upper end of the post 19 and having a shelf portion 23 to which contact springs 24 and 25 are securely attached. The contact springs are insulated from the shelf portion 23 and near their free ends carry cooperating silvered contact buttons 26. In the normal adjustment of the switch and weighing scale mechanism a Bakelite pin 27 carried in the lever 7 lifts the upper or flexible contact spring 24 far enough to separate the contacts 26 when the weighing scale mechanism is in its no load position. As soon as load is applied the lever moves downwardly permitting the contacts 26 to close and permit flow of current to the light bulbs 15 and 16.

The adjustment of the operating position of the switch 17 is controlled by rotation of the upwardly extending rod 18. The rod 18 is threaded through the lower end of a fitting 28 set in a base portion of the post 19 and extending downwardly into a hole drilled through the base 1 of the scale. The fitting 28 includes a long tubular section extending upwardly from the base as well as the threaded portion extending through the base. The rod 18 is reduced in diameter through the lower portion of its length to form a shoulder 29 that bears against a washer 30 lying on the shelf 21 of the switch frame 20. A helical compression spring 31 sleeved over the tubular portion of the fitting 28 presses upwardly against a second washer 32 bearing against the underside of the shelf portion 21 and tending to rotate the switch assembly clockwise as seen in Figure II. The lower end of the threaded portion of the rod 18 extends below the level of the base 1 and is provided with a split collar 33 so that the rod 18 cannot be unintentionally unscrewed from the fitting 28.

In this assembly the spring 31 continually urges the switch in a clockwise direction tending to bring the flexible spring leaf 24 into contact with the Bakelite pin 27. The threaded and shouldered portions of the rod 18 limit this movement and by the adjustment provided by the threaded portion allows the operating position to be accurately determined from the exterior of the housing.

Figure IV illustrates schematically the connections employed to feed the electrical current to the light bulbs 15 and 16. This circuit includes a first lead 34 which is connected to a source of power and which is electrically connected to the rigid switch leaf 25 carrying one of the contacts 26. When the switch is closed current may flow across the contacts 26 into the flexible spring leaf 24 and from that leaf through a lead 35 to the light bulb 16 or through a lead 36 to the light bulb 15. Return leads 37 and 38 from the light bulbs are connected in parallel to a return power lead 39. This wiring arrangement is quite similar to the circuits ordinarily employed in this type of weighing scale.

The improved switch assembly makes it possible to extend the adjusting member through a wall of the housing so that it is no longer necessary to disassemble the housing of the weighing scale to adjust the operating point of the light switch therein.

Various modifications and specific details of construction may be made without departing from the spirit and scope of the invention.

I claim:

1. In a weighing scale in which the flow of electric current to chart illuminating lamps enclosed within a housing of the scale is controlled by a switch operated by a lever of the scale, in combination, a standard erected from a stationary part of the scale adjacent a lever thereof, a switch assembly rockably mounted on the standard with a leaf contact of the switch assembly extending into the path of the lever near the zero load position of the lever, a sleeve extending from the base of the standards toward the rockable assembly, said sleeve having a portion extending into the path of the rockable switch assembly to limit the range of adjustment, a spring mounted on the sleeve and engaging the switch assembly to urge the switch leaf toward the lever, and a threaded rod that has a first end outside the housing, that has a shoulder engaging the switch assembly and that is threaded into the sleeve for adjustably controlling the position of the assembly.

2. In a weighing scale in which the flow of electric current to chart illuminating lamps enclosed within a housing of the scale is controlled by a switch operated by a lever of the scale, in combination, a standard erected from a stationary part of the scale adjacent a lever of the scale, a switch assembly rockably mounted on the standard, said assembly including a stiff switch leaf extending toward the zero position of the lever and a flexible switch leaf extending parallel to the first leaf and continuing beyond the first leaf into the path of the lever, an electrically insulated member on the lever adjacent the switch assembly, said switch leaves being arranged so that approach of the lever to its zero load position causes the insulated member to engage the flexible leaf and to separate it from contact with the rigid leaf, an internally threaded sleeve mounted in a stationary part of the scale adjacent the standard, a spring sleeved over the sleeve and contacting the switch assembly to rock it on the standard, means on the switch assembly that engages said sleeve to limit the rotation of the switch assembly and a rod that has a first end extending outside the housing of the scale, that has a shoulder engaging the rockable switch assembly in opposition to the spring, and that has a threaded portion threaded into the sleeve.

HALVOR W. HEM.

REFERENCES CITED

The following references are of record in the file of this patent:

UNITED STATES PATENTS

| Number | Name | Date |
| --- | --- | --- |
| 1,105,806 | Longstretch | Aug. 4, 1914 |
| 1,750,749 | Fonseca | Mar. 18, 1930 |
| 2,107,838 | Dean | Feb. 8, 1938 |
| 2,195,031 | Lachance | Mar. 26, 1940 |
| 2,338,365 | Thorp et al. | Jan. 4, 1944 |